US011932003B2

(12) United States Patent
Hall et al.

(10) Patent No.: US 11,932,003 B2
(45) Date of Patent: Mar. 19, 2024

(54) PRECISION CUT PRINTING SCREEN

(71) Applicant: Tannlin Technology Limited, East Ayrshire (GB)

(72) Inventors: James Stewart Hall, East Ayrshire (GB); James Graham Hall, East Ayrshire (GB)

(73) Assignee: TANNLIN TECHNOLOGY LIMITED, East Ayrshire (GB)

( * ) Notice: Subject to any disclaimer, the term of this patent is extended or adjusted under 35 U.S.C. 154(b) by 5 days.

(21) Appl. No.: 17/771,868

(22) PCT Filed: Oct. 16, 2020

(86) PCT No.: PCT/GB2020/052624
§ 371 (c)(1),
(2) Date: Apr. 26, 2022

(87) PCT Pub. No.: WO2021/084227
PCT Pub. Date: May 6, 2021

(65) Prior Publication Data

US 2022/0402261 A1 Dec. 22, 2022

(30) Foreign Application Priority Data

Oct. 29, 2019 (GB) ..................................... 1915700

(51) Int. Cl.

| | |
|---|---|
| ***B41F 15/34*** | (2006.01) |
| ***B41C 1/14*** | (2006.01) |
| ***B41F 15/36*** | (2006.01) |
| ***B41N 1/24*** | (2006.01) |

(52) U.S. Cl.
CPC .............. *B41F 15/36* (2013.01); *B41C 1/145* (2013.01); *B41N 1/247* (2013.01); *B41N 1/248* (2013.01); *B41P 2215/12* (2013.01)

(58) Field of Classification Search
CPC .......... B41F 15/34; B41F 15/36; B41C 1/145; B41N 1/24; B41N 1/247; B41N 1/248; B41P 2215/10
See application file for complete search history.

(56) References Cited

U.S. PATENT DOCUMENTS

| | | | | |
|---|---|---|---|---|
| 2002/0155637 A1 | 10/2002 | Lee | | |
| 2015/0083005 A1* | 3/2015 | Hall | ........................ | B41F 15/34<br>101/127.1 |
| 2016/0332437 A1* | 11/2016 | Guidi | ...................... | B41F 15/34 |

FOREIGN PATENT DOCUMENTS

| | | | |
|---|---|---|---|
| DE | 102010013348 A1 | 10/2011 |
| EP | 2147785 A1 | 1/2010 |
| GB | 2050104 A | 12/1980 |
| GB | 2276589 A | 10/1994 |

(Continued)

OTHER PUBLICATIONS

Combined Search and Examination Report for application No. GB1915700.7 dated Apr. 20, 2020.

(Continued)

*Primary Examiner* — Christopher E Mahoney
*Assistant Examiner* — Marissa Ferguson-Samreth
(74) *Attorney, Agent, or Firm* — MOSER TABOADA

(57) ABSTRACT

Disclosed is a precision cut printing screen in which the features of a printing pattern are defined on a sheet material by a plurality of apertures within a target printing boundary. Also disclosed is a method of making the printing screen.

23 Claims, 4 Drawing Sheets

(56) References Cited

FOREIGN PATENT DOCUMENTS

| | | | |
|---|---|---|---|
| GB | 2333742 | A | 8/1999 |
| JP | 2002192688 | A | 7/2002 |
| JP | 2017193065 | * | 10/2017 |
| JP | 2017193065 | A | 10/2017 |
| WO | WO-2014162146 | A1 | 10/2014 |

OTHER PUBLICATIONS

International Search Report and Written Opinion for application No. PCT/GB2020/052624, dated Mar. 2, 2021.

* cited by examiner

PRECISION CUT PRINTING SCREEN

FIELD OF THE INVENTION

The invention relates to the field of high-precision screen printing methods and apparatus.

BACKGROUND TO THE INVENTION

In certain technical applications, screen printing methods are used which require a high degree of dimensional precision, and accurate printed feature definition. For example, in printing of electronic features such as those required for modern batteries or printed electronics, sensor features and the like, the printed features must have consistently defined edge features as well as in may cases consistent ink levels across printed features.

Conventional precision screen printing is conducted using an emulsion screen. A mesh material (typically a woven steel or titanium mesh) having a suitable mesh size is selected, and a printing screen constructed in which the mesh is held in tension within a rigid frame. A layer of a photosensitive polymer-precursor solution or suspension is applied to the mesh. The photosensitive polymer is selectively cured to create a negative of the required printing pattern (for example using a UV laser, using a pre-cut sheet or mask or the like) and the uncured precursor washed away, to leave the desired printing pattern defined on the screen by bare areas of mesh bounded by a mask.

The resulting emulsion screens suffer from a number of inherent limitations.

One limitation of emulsion screens is that the position of mesh apertures in relation to printed feature boundaries can vary, both within a given printed feature, and between different features of a printing pattern. This is illustrated in FIG. 1, which is discussed in further detail below.

A mesh printing screen must be tensioned to maintain the mesh as flat as possible, to avoid pooling when the screen is removed once the printing medium or ink has been applied. Another limitation of emulsion screens is that since the aspect ratio of the tensioned mesh can vary across the printing screen, due to differing tension in different parts of the screen. Again, this can lead to inconsistencies in printing thickness and precision.

A further limitation is that the mesh forming an emulsion screen has a three dimensional character, resulting from mesh filaments being woven above and below one another, in relation to the plane of the printing screen, again leading to inconsistent flow of ink to a substrate.

The aforementioned drawbacks become particularly pronounced at lower ink viscosities and, although some of the drawbacks can be mitigated by selection of a smaller mech size, there is a trade-off with the speed or amount of ink which can then penetrate the mesh. The minimum mesh size is also limited, to around 100 microns between mesh filaments, and mesh filaments of around 30-50 microns in diameter.

Accordingly, there remains a need for improvements in high-precision screen printing.

SUMMARY OF THE INVENTION

According to a first aspect of the invention there is provided a printing screen comprising a sheet material, for screen printing a printing pattern comprising at least one continuous printed feature on a substrate;

the printing screen comprising a printing screen pattern comprising plurality of apertures within a printing screen pattern boundary representing a target boundary around a periphery of at least one feature to be printed on a substrate;

the at least one feature being defined on the sheet material by a plurality of apertures through the thickness of the sheet material, within the printing screen pattern boundary;

wherein the printing screen pattern boundary corresponds to the target pattern boundary when the printing screen is placed on a substrate in use.

A "feature" printed on a substrate is a continuous region of printing medium (e.g. ink) having a boundary around at least a part of its periphery. The target printing boundary is the idealised desired boundary or edge a said feature to be printed on a substrate. The features to be printed are represented by the printing screen pattern on the sheet material as a plurality of apertures through the sheet material within a printing screen pattern boundary, such that the features to be printed appear in effect in "pixelated" form on the printing screen. The printing pattern boundary corresponds to the target pattern boundary when the printing screen is placed on a substrate, in use, such that printing medium flows through the plurality of apertures and coalesces within the target printing boundary and a continuous feature is printed on the substrate.

The relationship between the apertures through the sheet material and the printing screen pattern boundary can be precisely selected and thus better optimised; for example, to accommodate the rheological characteristics of the printing medium, and so provide for a printed feature or features on a substrate, wherein the boundary around the or each printed feature most closely matches the target printing boundary, and thus the desired printing pattern, in use.

The printing screen pattern boundary of the at least one feature to be printed may have a predetermined spatial relationship to an array of the said apertures adjacent to the printing screen pattern boundary. Thus, then the printing screen is placed on a substrate in use, the target printing boundary of the at least one feature to be printed may have a predetermined spatial relationship to an array of the said apertures adjacent to the target printing boundary.

The printing screen may therefore comprise one or more features being defined by the said plurality of apertures, each feature having a said array around a part, or substantially all of its periphery.

The predetermined spatial relationship between the printing screen pattern boundary and the array of said apertures may comprise a minimum distance (in the plane of the sheet material) between an aperture in the array and the closest part of the printing screen pattern boundary (and thus, in use, the target printing boundary), wherein the minimum distance is shared between a series of, or all of the apertures in the array.

The predetermined spatial relationship between the target printing screen pattern boundary and the array of said apertures may comprise an acceptable range of minimum distances between the apertures in the array and the closest part of the printing screen pattern boundary.

That is to say, along a part or all of the printing screen pattern boundary of the said feature, the closest apertures to the printing screen pattern boundary (i.e. the members of the array) may be an equal minimum distance from the printing screen pattern boundary, or within an acceptable range of minimum distances from the boundary.

The predetermined spatial relationship may comprise a minimum distance, or acceptable range of minimum distances, between a series of adjacent apertures or each adjacent aperture in the array.

By minimum distance we refer to the closest distance in the plane of the sheet material, from the edge of the sheet material defining the respective apertures, and the position of the printing screen pattern boundary in relation to the sheet material or the closest edge defining an adjacent aperture, as the case may be.

It should be understood that necessarily the shape of the feature to be printed may result in variations in distance of some members of the array, for example at or near corners, curves, apices and the like. In such circumstances, the optimal position of an aperture adjacent to the printing screen pattern boundary and/or to an adjacent aperture, may also be dictated in part by a required distance to adjacent apertures in the array and/or adjacent apertures within the printing feature further from the printing screen pattern boundary.

By sheet material we refer to a sheet material such as a plastics or more typically metal sheet material, such as stainless steel. Exceptionally, the sheet material may comprise a fabric material or a membrane material, wherein the dimensions of any pore or apertures in the material are impermeable to the ink or printing medium being applied.

A sheet material can typically be more highly tensioned than a comparable fabric or mesh material, and so better resist sagging in use.

A sheet material also provides for a more uniformly planar surface to be applied to the substrate, than a mesh material (which must necessarily include filaments passing over and under one another out of the plane of the mesh being applied to a substrate).

The apertures may be cut by any suitable form of precision cutting, for example laser cutting, but also including photochemical machining, electrical discharge machining, or the like.

The dimensions of the apertures may be at least one order of magnitude, and in some embodiments two or more orders of magnitude smaller than a major dimension of the at least one feature to be printed, such that an array of apertures along or around the printing screen pattern boundary may comprise at least of the order of $10^1$-$10^3$ apertures, or more.

A feature to be printed may have and shape or configuration, and may have a major dimension, for example a length or a periphery, greater than a minor dimension, for example across all or a portion of a width or a thickness. For example, a printed feature may have a length (whether that be straight, curved, or convoluted) of the order of mm or cm, but a width of the order of mm, or microns.

For example, in some embodiments, a feature to be printed may have a surface area in the range of 1-500 $mm^2$, or 5-100 $mm^2$, or around 10-50 $mm^2$. A major dimension (e.g. across, along or around) a feature to be printed may for example be around 1-500 mm, 1-250 mm, or around 1-100 mm. A minor dimension (for example a thickness of a printed feature may be between around 0.05-5 mm, or 0.1-5 mm or around 0.2-3 mm.

The apertures may be any shape, but are conveniently generally circular. A circular aperture may be created by a single firing of a laser (or other precision machining head).

In some embodiments, generally circular features (of the same or different) created by a single firing (e.g. of a laser) may to some degree overlap, to create more complex aperture configurations.

The printing screen, or each feature thereof, may comprise apertures of a single size. Alternatively, at least one said feature may include apertures of multiple sizes. For example, the apertures may increase in size, with distance from the printing screen pattern boundary.

The apertures may be any suitable size, as required for a particular printing medium.

The apertures may range in size from a diameter (or width) of around 1 μm to around 500 μm, or between around 1-300 μm, or between around 5-300 μm. A given printing screen may include apertures sized around 10 μm, for example arrayed around one or more feature peripheries thereof, and larger apertures further from the peripheries of the or each feature (and thus the printing screen pattern boundary), up to for example 300 μm in size.

Precision cutting, and in particular laser cutting, may be used to create smaller apertures than would otherwise be available from a mesh printing screen, down to sizes of 10 microns or below for some screen materials. By contrast, even the finest available mesh screens (around 375 filaments per inch) have spacings of around 75-100 μm between filaments, and approximately 30 μm diameter filaments. Thus, at best apertures between the strands are in the region of 50 μm across, with potential variation in the optimal position of an aperture through a mesh and a target printing boundary being of the order of $10^1$ microns (i.e. the filament thickness).

The skilled person will understand that the aperture size may be selected based on printing medium (e.g. ink) viscosity. For example, larger apertures may be required for printing higher viscosity media. Higher viscosity media may have dynamic viscosities in the range from around 100-2000 Pa·s, or in the range from around 200-1800 Pa·s, or around 300-1600 Pa·s. Conversely, lower viscosity media may have viscosities in the range from around 0.01-100 Pa·s, or around 0.04-100 Pa·s, and require the use of smaller apertures, at least arrayed adjacent to the printing screen pattern boundary and, in use, the target printing boundary.

The printing screen, or each feature thereof, may comprise a constant number density of apertures (i.e. number of apertures per unit area of the feature to be printed). Alternatively, the number density of apertures may vary across at least one said feature. For example, the number density of apertures may increase or decrease with distance from the printing screen pattern boundary.

In some embodiments, both the number density and size of the apertures may vary across the representation of a said feature on the printing screen. For example, a higher number density of small apertures may be required around the printing screen pattern boundary of the at least one feature, to most precisely define the boundary of the resulting feature printed on a substrate (i.e. to most closely match the target printing boundary), whereas a lower number density of larger apertures may be used elsewhere within the representation of the feature to be printed.

A given printing pattern may include a representation of a number of features to be printed, each having different required levels of printing precision. For example, in some embodiments, a printing pattern may include representations of one or more high-precision features, such as battery terminals or sensors, extending to lower precision features, such as conducting tracks.

Precision cutting of a sheet material provides for complete control over the pixilation of each feature of a printing pattern to be printed.

The printing screen may comprise a frame, wherein the sheet material is mounted to the frame. The invention is not limited to any particular type of frame, and can for example be of a metal or plastics material, or any suitably rigid material. A metal (box or L-section) frame may be used in some embodiments.

The sheet material may be mounted to the frame in tension.

The sheet material may be mounted to the frame by any suitable means. For example, a plastics or a metal sheet material may be welded to a frame. The sheet material may be glued to a frame, or secured by fixings (screws, rivets or the like).

According to a second aspect of the invention there is provided a method of making a printing screen, comprising:

providing a sheet material; and precision cutting a printing pattern comprising a plurality of apertures through the thickness of the sheet material, within a printing screen pattern boundary representing a target boundary around a periphery of at least one feature of a printing pattern to be printed on a substrate, so as to define the at least one feature on the sheet material by the plurality of apertures.

The method may comprise laser cutting the apertures (although other precision cutting methods may also be employed).

The method may comprise tensioning (typically biaxially) the sheet material, in some embodiments prior to precision cutting.

The method may comprise mounting the sheet material to a frame. The sheet material may be tensioned and mounted to a frame in tension.

The method may comprise precision cutting an array of the said apertures in a predetermined spatial relationship with respect to the printing screen pattern boundary.

The method may comprise precision cutting a said array around a part, or substantially all of the periphery of the or each feature defined on the sheet material.

The invention extends in a third aspect to a method of printing a pattern comprising at least one printed feature on a substrate, the method comprising:

providing a printing screen according to the first aspect;

placing the printing screen on a substrate so as to place a first side of the printing screen against the substrate;

applying a printing medium to a second side of the printing screen; and flowing the printing medium through the apertures through the thickness of the sheet material to the substrate.

The method of printing may comprise passing a wiper across the printing screen, to distribute the printing medium. The wiper may be passed over the printing screen one or more times, and or in more than one direction or orientation over the printing screen.

The method may comprise removing excess printing medium from the second side of the printing screen.

The method may comprise removing the printing screen from the substrate, and further such steps as known in the field of screen printing.

The substrate may be planar. The substrate may be substantially horizontally oriented.

The printing screen may be tensioned, so as to be substantially planar, in use.

The printing screen may be provided by the method of the second aspect.

The invention is not limited to any particular form of substrate or printing medium. The substrate may for example be a plastics, or metal substrate. The substrate may comprise a composite material, such as a fibre glass or carbon fibre composite material. The substrate may be a fabrics material or a membranous material. The substrate may in some embodiments be a board for a printed circuit board.

The printing medium may be a solution, an ink, a solder paste or a suspension (for example a metallic colloid or a polymeric suspension). The printing medium may comprise a photoactive material or environmentally responsive material, such as a biological material.

Optional features of each aspect of the invention correspond to optional features of any other aspect of the invention. In particular the methods disclosed herein may comprise any such steps disclosed in relation to the function or use of the apparatus disclosed herein. Moreover the apparatus may comprise any such features required to carry out the methods disclosed herein.

DESCRIPTION OF THE DRAWINGS

Example embodiments will now be described with reference to the following figures in which.

DETAILED DESCRIPTION

Figure 1:
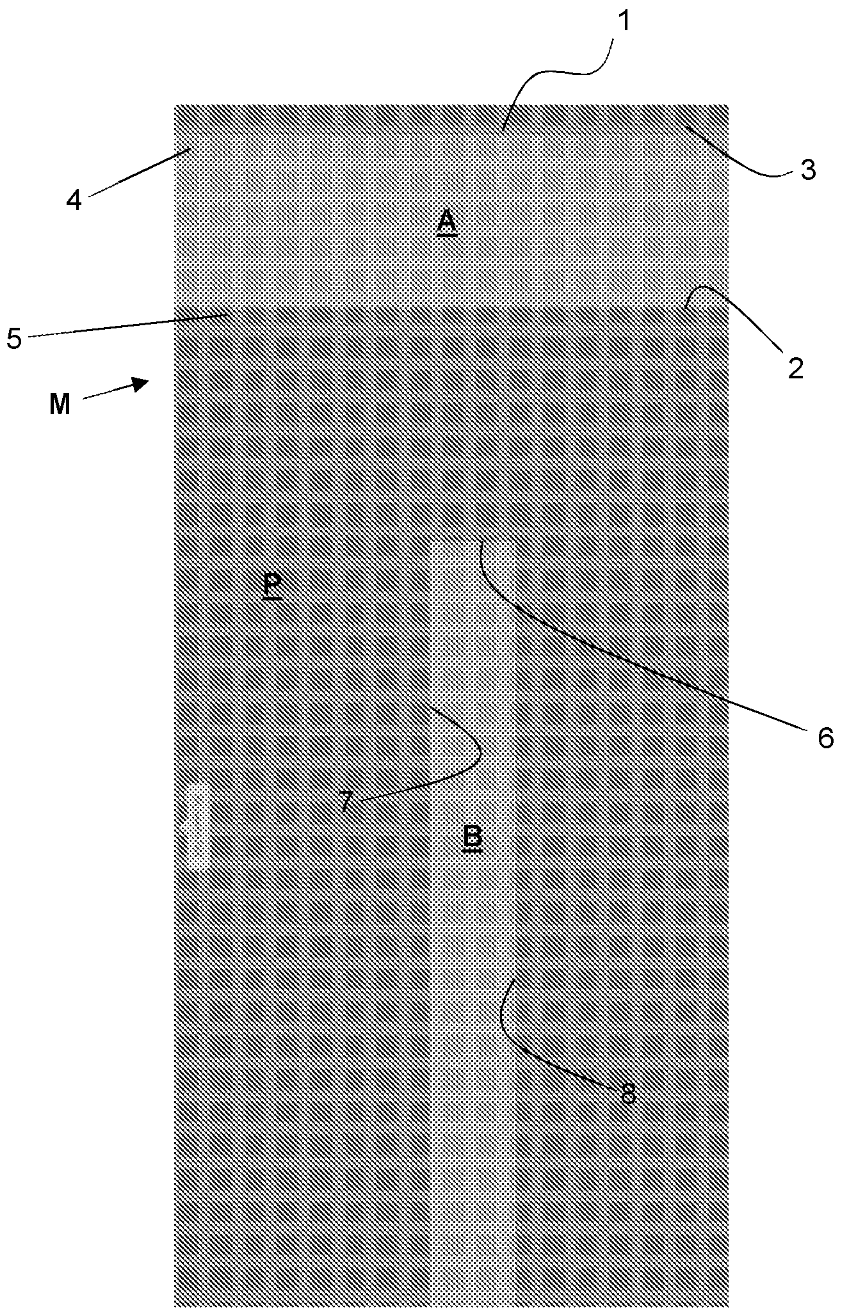
FIG. 1 shows a target printing boundary of a printing pattern superimposed on a mesh.

FIG. 1 shows the outline of two features A and B to be printed, of a printing pattern projected on to a conventional printing screen mesh M. To create an emulsion printing screen, a polymeric material would be created over the region P, leaving the features A and B of the mesh bare.

Feature A has target printing boundaries. These are represented on the mesh printing screen by printing screen pattern boundaries 1 and 2. Edge 1 has a filament 3 that runs along the edge 1, such that the boundary of the feature A is bounded by the edges of the apertures 4 in the mesh. Another printing screen pattern boundary 2, however, runs part way along a row of apertures 5. As a consequence, ink will inevitably flow into the apertures 5, beyond the boundary 2 of the printed feature A, when printing the feature A onto a substrate. Similarly, the relationship between the printing screen pattern boundaries 6, 7, and 8 of feature B are all different from one another in relation to the positions of the mesh filaments and apertures.

Figure 2A:
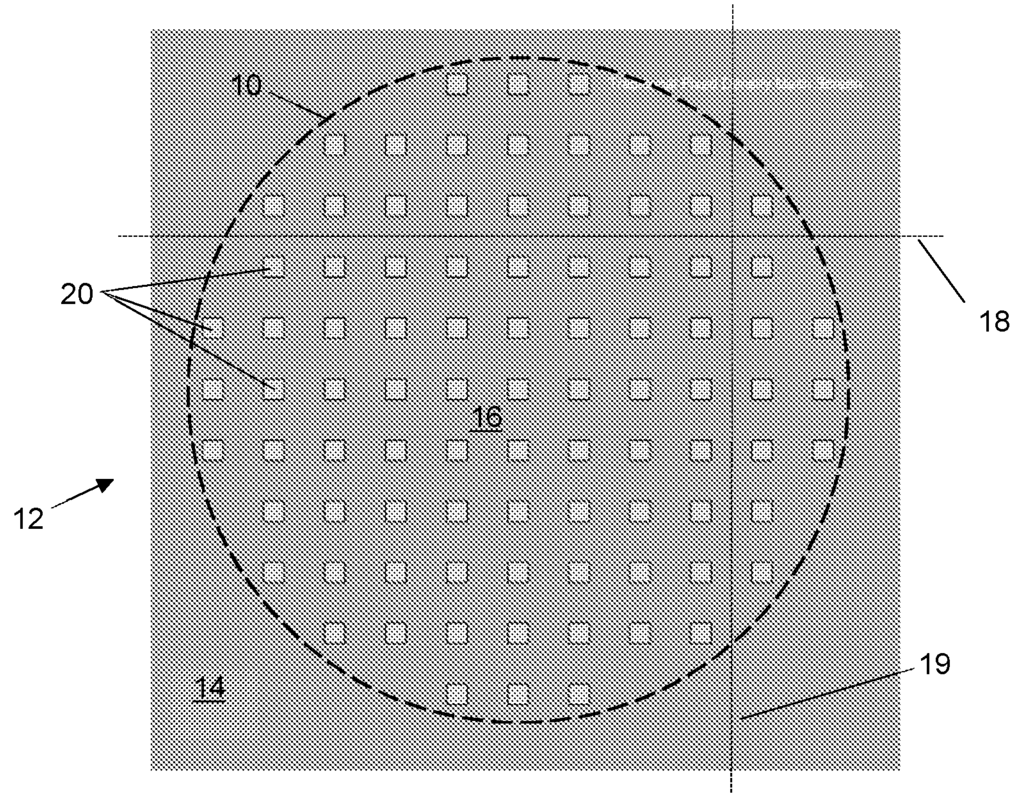
FIG. 2(*a*) shows a circular printing screen pattern boundary of a feature a printing pattern on a mesh printing screen, and FIG. 2(*b*) shows the same circular feature on a sheet material.
Figure 2B:
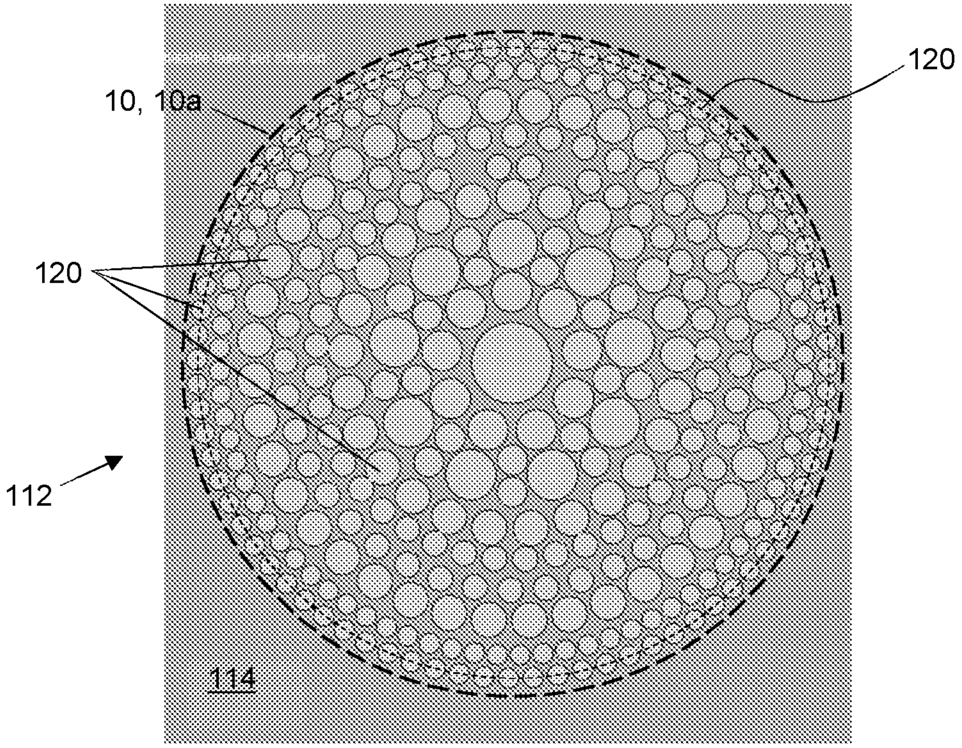
Figure 3A:
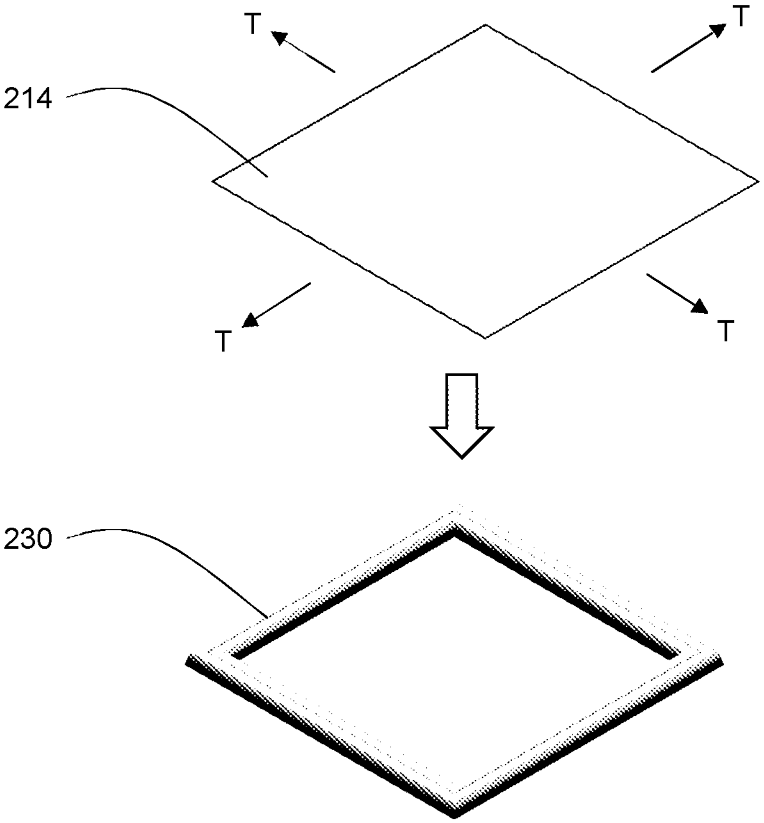
FIGS. 3(*a*) to 3(*d*) schematically illustrate the steps of a method of making an embodiment of a printing screen.
Figure 3B:
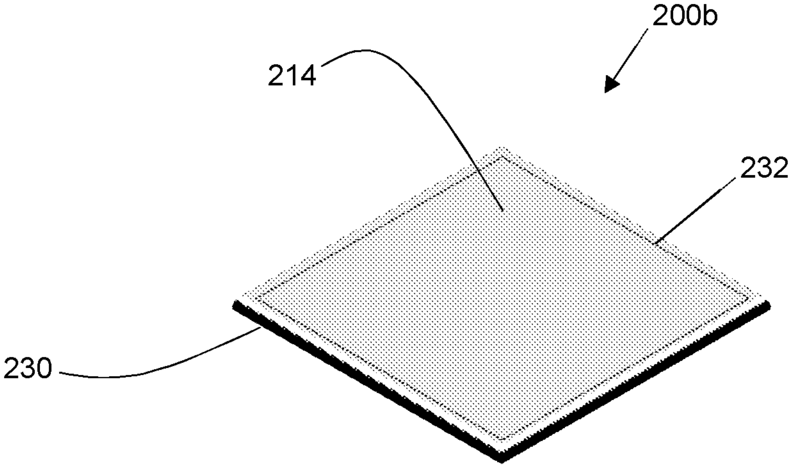
Figure 3C:
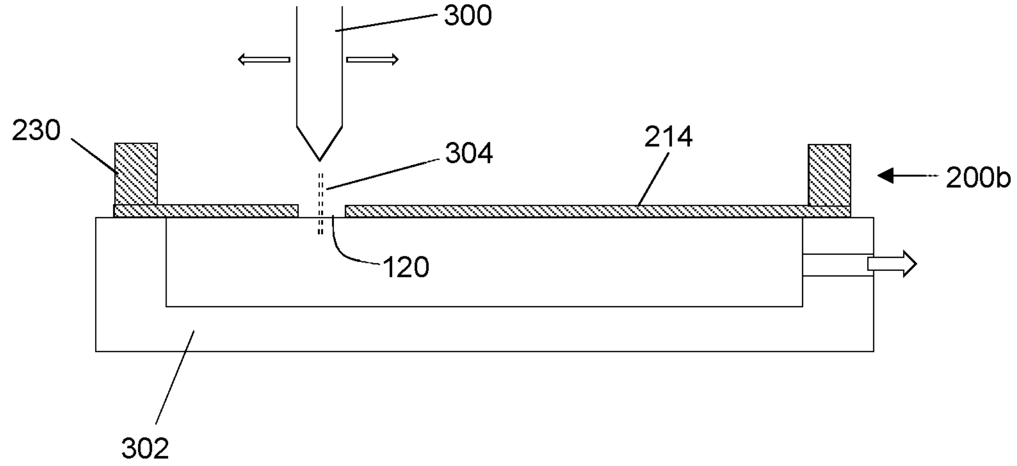
Figure 3D:
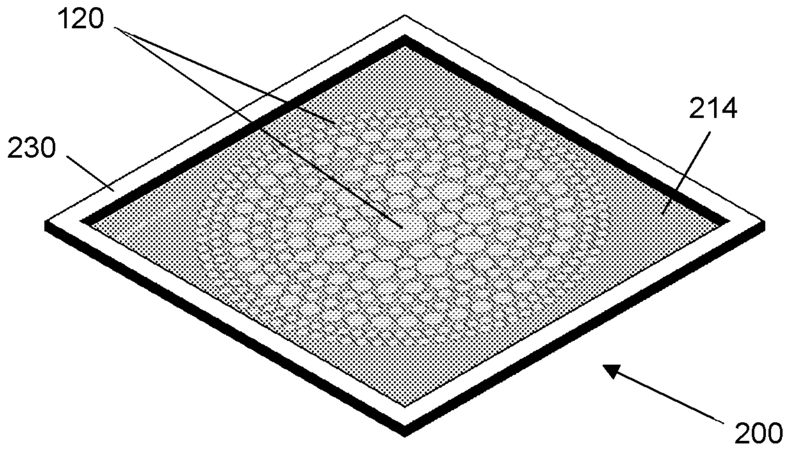

FIG. 2(*a*) is a diagram which shows the outline (i.e. the printing screen pattern boundary, and thus when placed on a substrate, the target printing boundary) of a circular feature 10 of a printing pattern represented on an emulsion screen 12 made from a metal mesh. The emulsion screen has a masked area 14, and a bare area 16. The feature 10 to be printed is represented on the emulsion screen 12 by apertures 20 between woven wire filaments. The filaments themselves are omitted for clarity, however example paths of the filaments (as viewed from perpendicular to the screen) are shown by the dotted lines 18, 19. It will also be understood that each of the filaments alternately pass over and under other filaments across the printing screen and therefore curve in and out of the plane of the screen, leading to differences between the configuration of each apertures 16 in relation to a planar substrate, in three dimensions.

The apertures 16 are necessarily arranged in rows and columns and so in use, the distance between the target boundary of the feature 10 and the nearest aperture 16 within its boundary varies significantly around the periphery of the feature 10. This severely limits the extent to which the circular shape of the feature 10 can be reflected in the final printed pattern on a substrate.

FIG. 2(*b*) shows an embodiment of a printing screen 112 as disclosed herein, comprising a sheet material 114 (stainless steel in the embodiment shown). The circular feature 10 is defined on the sheet material by a plurality of apertures 120 which have been laser cut through the thickness of the sheet material 114, within a printing screen pattern boundary 10*a*.

The array 122 of apertures 120 adjacent to the boundary of the feature 10*a* extends around the printing screen pattern boundary 10*a* (in this case the circumference) of the feature 10. The apertures in the array 122 have a predetermined spatial relationship to one another and in this embodiment are equidistant from the boundary 10*a*, and to one another; thus providing a more accurate representation of the feature 10 (i.e. with a boundary more closely related to the target printing boundary) when, printed on a substrate.

While the apertures in the array 122 in the embodiment shown are evenly spaced from the boundary 10*a* and each other, in other embodiments, for example in relation to more complex or convoluted printing boundaries, these distances, or indeed the shape of the apertures, may be required to vary. For example, whilst a series (more than two in a row) of apertures may have the same spatial relationship to the printing screen pattern boundary as each other along one part of a boundary, the relationship may differ in other parts, for example more tightly curved regions, corners etc. In other parts of the printing screen pattern boundary, therefore, the size, shape and or spatial relationships may differ.

Referring again to FIG. 2(*b*), both the size and the number density of the apertures 120 differs with distance from the printing screen pattern boundary 10*a* of the feature 10. The aperture size generally increases towards the middle of the feature, and the number density generally decreases. However the sizes of the apertures do increase and then decrease with distance from the boundary in the embodiment shown, in order to allow the apertures to "tesselate" somewhat and reduce the minimum distance between apertures.

FIG. 3 is a schematic showing a method of making an embodiment of a printing screen. Referring now to FIG. 3(*a*), a sheet 214 of steel is provided. The sheet 214 is then tensioned, in the example shown biaxially (i.e. by mechanically gripping the edges of the sheet and applying outward forces in the plane of the sheet), illustrated by the arrows T. Means for tensioning metal sheets are well known in the art.

Whilst under tension, the sheet is mounted to a metal box section frame 230, and spot welded around its periphery 232, as shown in FIG. 3(*b*), such that the sheet 214 is maintained in tension in the resulting "blank" screen 200*b*.

The blank screen 200*b* is then placed under a precision laser machining head 300, such as that of a Tannlin T-series of ventilated stencil laser systems (Tannlin is a trade mark). This is illustrated in the schematic cross sectional side view of FIG. 3(*c*), showing the blank screen 200*b* supported over a ventilated well 302. A laser beam 304 cuts a plurality of apertures 120 through the thickness of the material 214, within a printing screen pattern boundary representing a target boundary of at least one feature to be printed on a substrate. Thus, the at least one feature is represented on the sheet material (in "pixelated" form) by the plurality of apertures; as disclosed herein. The CNC control over laser machining processes, and the features of the associated apparatus are known to those skilled in the art.

The resulting printing screen 200 is shown in FIG. 3(*d*). The screen 200 can then be used in screen printing processes in a generally conventional manner, by placing the screen 200 on a substrate with the sheet 214 face down on the substrate. Ink or another desired printing medium is placed on the upper side of the sheet 214 and spread over the sheet by a wiper (not shown) such that the printing medium flows through the apertures 120 and on to the substrate, thereby creating the printing pattern.

Whilst exemplary embodiments have been described herein, these should not be construed as limiting to the modifications and variations possible within the scope of the invention as disclosed herein and recited in the appended claims.

The invention claimed is:

1. A tensioned printing screen for screen printing a printing pattern, comprising at least one continuous printed feature, on a substrate, the tensioned printing screen comprising:

a sheet material; and a printing screen pattern comprising plurality of apertures within a printing screen pattern boundary representing a target pattern boundary around a periphery of at least one continuous feature to be printed on the substrate, wherein the at least one continuous feature is defined on the sheet material by a plurality of apertures through the thickness of the sheet material, within the printing screen pattern boundary;

wherein the printing screen pattern boundary corresponds to the target pattern boundary when the tensioned printing screen is placed on the substrate in use.

2. The printing screen of claim 1, wherein the printing screen pattern boundary of the at least one continuous feature to be printed has a predetermined spatial relationship to an array of said plurality of apertures adjacent to the printing screen pattern boundary.

3. The tensioned printing screen of claim 2, wherein the predetermined spatial relationship comprises a minimum distance, or range of minimum distances, between an aperture in the array and the closest part of the printing screen pattern boundary, wherein the minimum distance or range is shared between a series of or all of the apertures in the array.

4. The tensioned printing screen of claim 3, wherein the predetermined spatial relationship comprises a minimum distance, or acceptable range of minimum distances, between a series of adjacent apertures or each adjacent aperture in the array.

5. The tensioned printing screen claim 1, wherein the sheet material comprises a metal sheet material.

6. The tensioned printing screen of claim 1, wherein said plurality of apertures are provided by laser cutting.

7. The tensioned printing screen of claim 1, wherein the at least one continuous feature to be printed has surface area in the range of 1-500 $mm^2$, and/or wherein said plurality of apertures have a diameter or width between around 1 μm and 500 μm.

8. The tensioned printing screen of claim 1, wherein at least one said continuous feature includes apertures of said plurality of apertures of multiple sizes and which increase in size with distance from the printing screen pattern boundary; and/or wherein the number density of apertures of said plurality of apertures decreases with distance from the printing screen pattern boundary of the at least one said feature.

9. The tensioned printing screen of claim 1, comprising a frame, wherein the sheet material is mounted to the frame in tension.

10. The tensioned printing screen of claim 9, wherein the sheet material is welded to the frame.

11. A method of printing a pattern on a substrate, the method comprising:
- providing a tensioned printing screen according to claim 1;
- placing the tensioned printing screen on a substrate so as to place a first side of the tensioned printing screen against the substrate;
- applying a printing medium to a second side of the tensioned printing screen; and
- flowing the printing medium through said plurality of apertures through the thickness of the sheet material to the substrate.

12. The method of claim 11, comprising passing a wiper across the tensioned printing screen, to distribute the printing medium.

13. The method of claim 12, comprising removing the tensioned printing screen from the substrate.

14. A method of making a tensioned printing screen, comprising:
- providing a sheet material;
- tensioning the sheet material; and
- precision cutting a printing pattern comprising a plurality of apertures through the thickness of the sheet material, within a printing screen pattern boundary representing a target pattern boundary around a periphery of at least one continuous feature of a printing pattern to be printed on a substrate, so as to define the at least one continuous feature on the sheet material by the plurality of apertures.

15. The method of claim 14, comprising laser cutting said plurality of apertures.

16. The method of claim 14, comprising tensioning the sheet material prior to precision cutting.

17. The method of claim 14, comprising mounting the sheet material to a frame.

18. The method of claim 14, mounting the sheet material to a frame in tension.

19. The method of claim 14, comprising precision cutting an array of said plurality of apertures in a predetermined spatial relationship with respect to the printing screen pattern boundary.

20. The method of claim 19, comprising precision cutting a said array around a part, or substantially all of the periphery of the at least one continuous feature defined on the sheet material.

21. The method of claim 14, comprising mounting the sheet material to a frame in tension, prior to the precision cutting a printing pattern.

22. A method of printing a pattern on a substrate, the method comprising:
- providing a printing screen made according to the method of claim 21;
- placing the printing screen on a substrate so as to place a first side of the printing screen against the substrate;
- applying a printing medium to a second side of the printing screen; and
- flowing the printing medium through the apertures through the thickness of the sheet material to the substrate.

23. A method of printing a pattern on a substrate, the method comprising:
- providing a printing screen made according to the method of claim 14;
- placing the printing screen on a substrate so as to place a first side of the printing screen against the substrate;
- applying a printing medium to a second side of the printing screen; and
- flowing the printing medium through the apertures through the thickness of the sheet material to the substrate.

* * * * *